3,767,804
METHOD OF COMBATTING MALARIA
Willy Burkard, Reinach, Alfred Rheiner, Jr., Basel, and Rolf Richle, Mohlin, Switzerland, assignors to Hoffmann-La Roche Inc., Nutley, N.J.
No Drawing. Filed July 21, 1971, Ser. No. 164,936
Int. Cl. A61k 27/00
U.S. Cl. 424—270                                4 Claims

ABSTRACT OF THE DISCLOSURE

Pharmaceutical compositions useful as antimalarials which contain as the active ingredient a compound selected from the group consisting of 1,1-diethyl-3-(2-thiazolyl)-2-thiourea, 1-methyl-3-(2-thiazolyl)-2-thiourea, 1,1-dimethyl-3-(4-methyl-2-thiazolyl)-2-thiourea and acid addition salts thereof.

DETAILED DESCRIPTION OF THE INVENTION

The present invention is directed to compositions comprising 1,1-diethyl-3-(2-thiazolyl)-2-thiourea, 1-methyl-3-(2-thiazolyl)-2-thiourea, and 1,1-dimethyl-3-(4-methyl-2-thiazolyl)-2-thiourea and their pharmaceutically acceptable acid addition salts and pharmaceutically acceptable carrier materials. The therapeutically active ingredients of the present invention exist in tautomeric forms. Hence, it will be appreciated that these compounds can be present as mixtures of such forms in the compositions of the invention.

The pharmaceutically acceptable salts of the active ingredients of the therapeutic preparations of the present invention include salts with both organic and inorganic acids conventional in the art of pharmaceutical compounding. Suitable acids include inorganic acids such as, for example, hydrochloric acid, hydrobromic acid, sulfuric acid, phosphoric acid and the like and organic acids such as, for example, benzoic acid, citric acid, acetic acid, tartaric acid, lactic acid and the like.

The therapeutically active compositions of the present invention are useful as antimalarials as well as for their strong inhibiting activity on the enzyme dopamine β-hydroxylase and may thus be useful as blood pressure lowering agents. These therapeutic activities are demonstrated by the following experiments.

To demonstrate the antimalarial activity of the active compounds of the invention, each of six mice were infected intraperitoneally with $10^7$ mouse erythrocytes infected with *Plasmodium berghei*. The active compound was administered 4 hours before and at 24, 48, and 72 hours after the infection. Twenty-four hours after conclusion of treatment a blood smear was prepared from each mouse, colored according to the method of Giemsa and analyzed microscopically in comparison with untreated, infected control mice. The dosage at which the number of parasitized erythrocytes is reduced to one-half was taken as the $ED_{50}$. Results of such tests with examples of the active compounds of the invention are set forth in Table I.

TABLE I

| Active ingredient: | $ED_{50}$ mg./kg. p.o. |
|---|---|
| 1,1-diethyl-3-(2-thiazolyl)-2-thiourea | 7 |
| 1-methyl-3-(2-thiazolyl)-2-thiourea (ca) | 10 |
| 1,1-dimethyl-3-(4-methyl-2-thiazolyl)-2-thiourea (ca) | 20 |

The acute toxicity of the active ingredients of the therapeutic compositions of the present invention was found to be generally between 150 and 2500 mg./kg. p.o. in the mouse.

In human medicine, the active compounds of the compositions of the invention are administered enterally, e.g., orally or rectally or parenterally. Generally, parenteral administration is preferred in the therapy of severe cases whereas enteral administration is suitable for prophylaxis and most therapy situations. In most therapeutic situations a daily dosage of between 100 mg. and 1000 mg., preferably between 300 mg. and 600 mg. as a single dose is contemplated for the average adult. For parenteral treatment of severe cases a dosage of between 500 mg. and 1000 mg. is contemplated.

Accordingly, unit dosage forms of the compositions of the present invention contain between 100 mg. and 1000 mg., preferably between 250 mg. and 600 mg. and most preferably 250 mg. of the active ingredient. When such unit dosage forms are tablets, such tablets may be single- or double-scored to allow for flexibility of dosage regimens.

The active compounds of the invention are particularly advantageous in that they do not demonstrate cross-resistance with known anti-malarials. Hence, these compounds can be utilized in countries where recognized antimalarial agents have proved ineffective.

The dopamine β-hydroxylase inhibitory activity of the compounds of the invention was demonstrated in vivo as follows. Groups of 6 male rats weighting 150–180 g. were given per os varying dasages of the compound to be tested, five times over a period of 2.5 days. Three hours after the final administration, the rats were sacrificed and the noradrenaline and dopamine content of the brain determined. These determinations are set forth in Table II as percents as compared to controls which equal 100 percent.

TABLE II

| Active ingredient | Dosage, μmol/kg. | Noradrenaline | Dopamine |
|---|---|---|---|
| 1,1-diethyl-3-(2-thiazolyl)-2-thiourea | 300 | 19 | 95 |
| 1-methyl-3-(2-thiazolyl)-2-thiourea | 100 | 18 | 106 |
| 1,1-dimethyl-3-(4-methyl-2-thiazolyl)-2-thiourea | 100 | [1] 15 | [1] 128 |

[1] Starved rats, 3 administrations within 16 hours.

It has also been found that a significant lowering of the noradrenaline level can be correlated to a lowering of blood pressure.

The following examples illustrate the invention:

EXAMPLE 1

Tablets of the following compositions were manufactured as follows:

(1)

| | Mg. |
|---|---|
| 1,1-diethyl-3-(2-thiazolyl)-2-thiourea | 250 |
| Corn starch | 278 |
| Lactose | 70 |
| Magnesium stearate | 2 |
| Total | 600 |

(2)

| | |
|---|---|
| 1-methyl-3-(2-thiazolyl)-2-thiourea | 250 |
| Corn starch | 278 |
| Lactose | 70 |
| Magnesium stearate | 2 |
| Total | 600 |

The active ingredient and a part of the aforementioned carriers were granulated with a corn-starch paste. After drying, a powdered mixture of corn starch and magnesium stearate was added and the mixture compressed on a tabletting machine to tablets of 13 mm. thickness, 600 mg. weight and hardness of 6–8 SCE.

EXAMPLE 2

An injection solution of the following composition was manufactured as follows:

|  | Ml. |
|---|---|
| Glycerine formal | 0.5 |
| Diethanolamine | 0.076 |
| Water | 0.5 |

1,1-diethyl-3-(2-thiazolyl)-2-thiourea: 500 mg.

The solution is prepared according to usual procedures, filtered and filled into ampules under an inert gas and sterilized.

What is claimed is:

1. A method of combatting malaria in a mammalian host which comprises administering to said host an antimalarially effective amount of an active ingredient selected from the group consisting of 1,1-diethyl-3-(2-thiazolyl)-2-thiourea, 1-methyl-3-(2-thiazolyl)-2-thiourea, 1,1 - dimethyl - 3 - (4-methyl-2-thiazolyl)-2-thiourea, and pharmaceutically acceptable acid addition salts thereof.

2. A method in accordance with claim 1 wherein a sufficient amount of said active ingredient administered is from about 100 mg. to about 1000 mg.

3. The method of claim 2 wherein said active ingredient is administered orally as a single daily dose.

4. The method of claim 2 wherein said active ingredient is administered parenterally as a single daily dose.

References Cited

Chemical Abstracts 69: 96554g (1968).

JEROME D. GOLDBERG, Primary Examiner